US012705542B2

(12) United States Patent
Hillson et al.

(10) Patent No.: US 12,705,542 B2
(45) Date of Patent: Aug. 11, 2026

(54) MACHINE LEARNED RESOURCE ALLOCATION MODELS FOR CENTRALIZED DATABASE PREDICTIONS

(71) Applicant: Gusto, Inc., San Francisco, CA (US)

(72) Inventors: Christian Franklin Hillson, Highlands Ranch, CO (US); Jacques Robert Caspi, Denver, CO (US); Andrew Collins Bessey, New York, NY (US); Lilly Anne Pieper, Boston, MA (US); Ryan David Kappedal, Olympia, WA (US); Jasmine Walker Motupalli, Centennial, CO (US); Addison Woodford Bohannon, Chicago, IL (US); Rebecca Alice Carter, Oakland, CA (US)

(73) Assignee: Gusto, Inc., San Francisco, CA (US)

( * ) Notice: Subject to any disclaimer, the term of this patent is extended or adjusted under 35 U.S.C. 154(b) by 522 days.

(21) Appl. No.: 18/468,540

(22) Filed: Sep. 15, 2023

(65) Prior Publication Data

US 2025/0094859 A1 Mar. 20, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 10,402,193 B2 * 9/2019 Boss .......................... G06F 8/70
10,613,899 B1 * 4/2020 Saha ...................... G06N 20/20
11,023,210 B2 * 6/2021 Li ............................ G06F 8/73
11,381,468 B1 * 7/2022 Thompson ............ H04L 67/101
11,449,804 B2 * 9/2022 Huang ................... G06N 20/00
11,605,025 B2 * 3/2023 Peh ........................ G06Q 10/20

(Continued)

FOREIGN PATENT DOCUMENTS

CA 3129199 A1 3/2022

OTHER PUBLICATIONS

PCT International Search Report and Written Opinion, PCT Application No. PCT/US 24/46242, Nov. 26, 2024, nine pages.

(Continued)

*Primary Examiner* — Maikhanh Nguyen
(74) *Attorney, Agent, or Firm* — Fenwick & West LLP

(57) ABSTRACT

A central database system trains and applies machine-learned models based on characteristics of one or more entities associated with the central database system. For instance, the central database system trains a machine-learned model configured to identify issues a target entity is likely to encounter based on training data identifying characteristics of historical entities and issues faced by the historical entities. Likewise, the central database system trains machine-learned models configured to predict actions that entities are likely to take in the future, and resources required to take those actions. The central database system can then perform one or more proactive actions or make one or more recommendations based on the predicted issues, the predicted future actions, and the predicted required resources.

18 Claims, 8 Drawing Sheets

(56) References Cited

U.S. PATENT DOCUMENTS 11,734,613 B2 * 8/2023 Huang .................. G06N 20/10 706/12
12,106,147 B2 * 10/2024 Guo .................... G06N 3/0442
12,321,788 B2 * 6/2025 Ocon Cardenas .... G06F 9/5022
12,505,396 B2 * 12/2025 Hillson ............ G06Q 10/06315
2002/0129035 A1 9/2002 Hayes et al.
2003/0018656 A1 1/2003 Schutzman et al.
2003/0061218 A1 3/2003 Iyer et al.
2011/0202657 A1 * 8/2011 Chang .................... G06F 9/505 709/226
2015/0269335 A1 9/2015 Gupta et al.
2016/0380908 A1 12/2016 Larsson et al.
2018/0330303 A1 11/2018 Mosley et al.
2019/0182059 A1 6/2019 Abdou et al.
2020/0357003 A1 11/2020 Buzek
2021/0004706 A1 1/2021 Riddle et al.
2021/0073819 A1 3/2021 Hernandez et al.
2021/0142249 A1 5/2021 Ellsworth et al.
2021/0166251 A1 6/2021 Mehmanpazir et al.
2022/0076156 A1 3/2022 Huang et al.
2022/0076329 A1 3/2022 Sugimura et al.
2022/0326999 A1 * 10/2022 Penney ................ G06F 9/5027
2022/0405134 A1 12/2022 Guo et al.
2022/0405590 A1 12/2022 Hebets
2023/0062351 A1 3/2023 Shao et al.
2023/0118846 A1 4/2023 Cardenas et al.

OTHER PUBLICATIONS

Zhao, L. "Event Prediction in the Big Data Era: A Systematic Survey," ACM Computing Surveys, vol. 54, No. 5, Article 94, May 23, 2021, pp. 1-37.

Alvarez, Pedro Mejia, Marcelo Leon Ayala, and Susana Ortega Cisneros. Main memory management on relational database systems. Springer International Publishing, 2022. (Year: 2022).

I. J. Salerno, D. Boulware and R. Cardillo, "Knowledge representation requirements for situation awareness," 2005 7th International Conference on Information Fusion, Philadelphia, PA, USA, 2005,. (Year: 2005).

Non-Final Rejection Mailed on Aug. 27, 2024 for U.S. Appl. No. 18/468,541, 24 page(s).

United States Office Action, U.S. Appl. No. 18/468,543, filed Aug. 20, 2025, 43 pages.

United States Office Action, U.S. Appl. No. 18/468,543, filed Jun. 20, 2025, 37 pages.

* cited by examiner

100

MACHINE LEARNED RESOURCE ALLOCATION MODELS FOR CENTRALIZED DATABASE PREDICTIONS

BACKGROUND

This disclosure relates generally to database systems, and more specifically to training and applying machine-learned models in a database system.

Centralized database systems, such as employment management database systems, store large amounts of data for the various entities associated with the database systems. In some embodiments, this data includes relationships between the entities associated with the database system. Accordingly, centralized database systems may be able to help identify patterns and characteristics of the related entities, providing valuable insight into events experienced by the related entities, and enabling the centralized database systems to implement customer experience-improving functionalities based on these insights.

SUMMARY

A central database system accesses, for each of a set of historical entities, historical data describing issues previously encountered by the historical entity. The central database system also accesses historical entity data describing characteristics of each historical entity. The central database system generates a training set of data based on the accessed historical data and historical entity data and trains a machine-learned model using the training set of data. The machine-learned model is configured to determine, for each issue of a set of issues, a probability that an entity will encounter the issue within a threshold interval of time. The machine-learned model accesses a set of characteristics associated with a target entity, where the characteristics include, at least in part, information describing issues previously encountered by the target entity. The central database system applies the machine-learned model to the accessed set of characteristics associated with the target entity to identify a future issue that the target entity is likely to face. The central database system proactively performs an action for the target entity based on the accessed set of characteristics and the identified future issue.

The central database system can additionally access historical data for historical entities describing actions taken by the entities and characteristics of the entities as the entities change over time. A training set of data can be generated based on the historical data, and the central database system can train a machine-learned model using the training set of data. The machine-learned model is configured to predict actions that an entity is likely to perform based on characteristics of the entity. The machine-learned model can then be applied to characteristics of a target entity to identify actions that the target entity is likely to perform, and the central database system can proactively perform one or more actions associated with the predicted set of actions in advance of the predicted set of actions being performed by the target entity.

The central database can additionally access historical data for historical entities describing historical time periods, historical actions taken or requested by the historical entities during the historical time periods, and historical resources required by the central database system to perform the requested historical actions during the historical time periods. A training set of data can be generated based on the historical data, and the central database system can train a machine-learned model using the training set of data. The machine-learned model is configured to predict resources required to perform actions requested by an entity during a time period. The machine-learned model can be applied to characteristics of a target entity and a target time period to predict a set of resources required by the target entity to perform a set of target actions. The central database system can then modify a configuration of the central database system in order to make the predicted set of resources available to the target entity in advance of the target time period.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
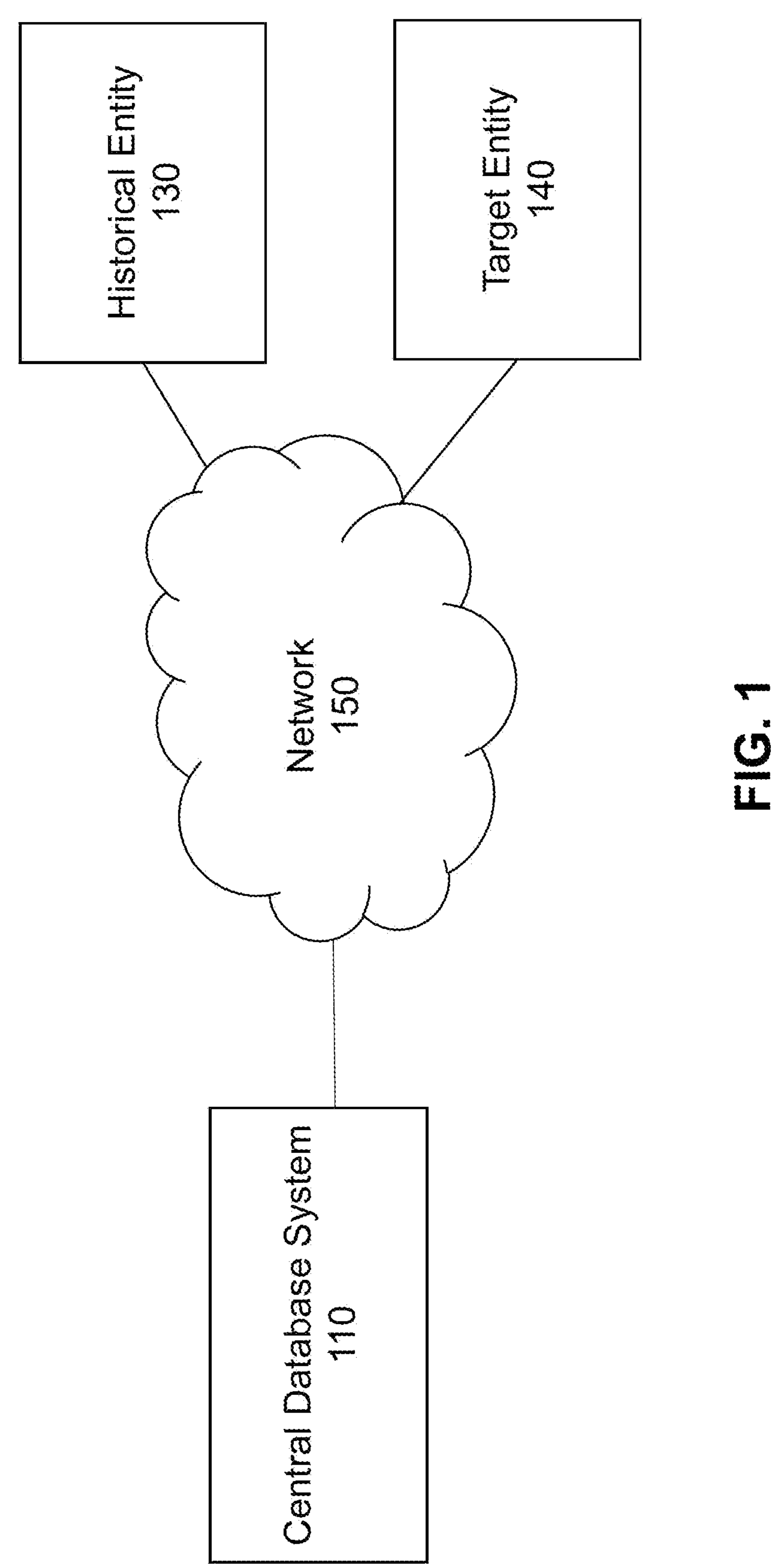
FIG. 1 is a block diagram of a system environment in which a central database system operates, according to one embodiment.

FIG. 1 is a block diagram of a system environment 100 in which a central database system operates, in accordance with an embodiment. The system environment 100 shown by FIG. 1 includes a central database system 110, one or more historical entities 130, one or more target entities 140, and a network 150. The system environment 100 may have alternative configurations than shown in FIG. 1, including for example different, fewer, or additional components.

The central database system 110 is, in some embodiments, a human resources management system configured to receive and store information associated with one or more entities, including one or more historical entities 130 and target entity 140 ("the entities"). Each entity may be an institution (e.g., a corporation, a partnership, law firm, an educational institution, an organization, etc.) that employs and/or associates with one or more individuals. The central database system 110 stores information describing these individuals as well relationships between the individuals and each of the entities. For example, the central database system 110 may include information about an individual's hiring date, employment level, position, title, geographic information, salary, benefits, tax status, contact information, and so on. The central database system 110 also stores characteristics describing both the historical entity 130 and target entity 140. Characteristics include, for example, information relating to an entity's size, type, industry, tax status, domicile, incorporation and/or formation, management personnel, customer base, as well as actions performed by the entities or by individuals associated with the entities, resources used by the entities or individuals associated with the entities, and issues encountered by the entities or individuals associated with the entities.

The central database system 110 may train and apply machine-learned models using these stored characteristics to predict events the target entity 140 may experience in the future. In some embodiments, machine-learned models can be trained and applied to help predict resources that the central database system 110 will need to perform actions, or to address and mitigate issues that will be experienced by the entities.

The central database system 110 may be a server, server group or cluster (including remote servers), or other suitable computing device or system of devices. The central database system 110 may communicate with other devices, including those associated with the historical entities 130 and the target entity 140, via client devices over the network 150 to receive and send information about individuals and the entities. Examples of client devices include conventional computer systems (such as a desktop or a laptop computer, a server, a cloud computing device, and the like), mobile computing devices (such as smartphones, tablet computers, mobile devices, and the like), or any other device having computer functionality. The devices of the historical 130, the target entity 140, and the central database system 110 are configured to communicate via the network 120, for example using a native application executed by the devices or through an application programming interface (API) running on a native operating system of the devices, such as IOS® or ANDROID™. In another example, the devices of the historical 130, the target entity 140, and the central database system 110 communicate via an API running on the central database system.

The central database system 110, the historical entities 130, and the target entity 140 are configured to communicate via the network 150, which may comprise any combination of local area and/or wide area networks, using wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Figure 2:
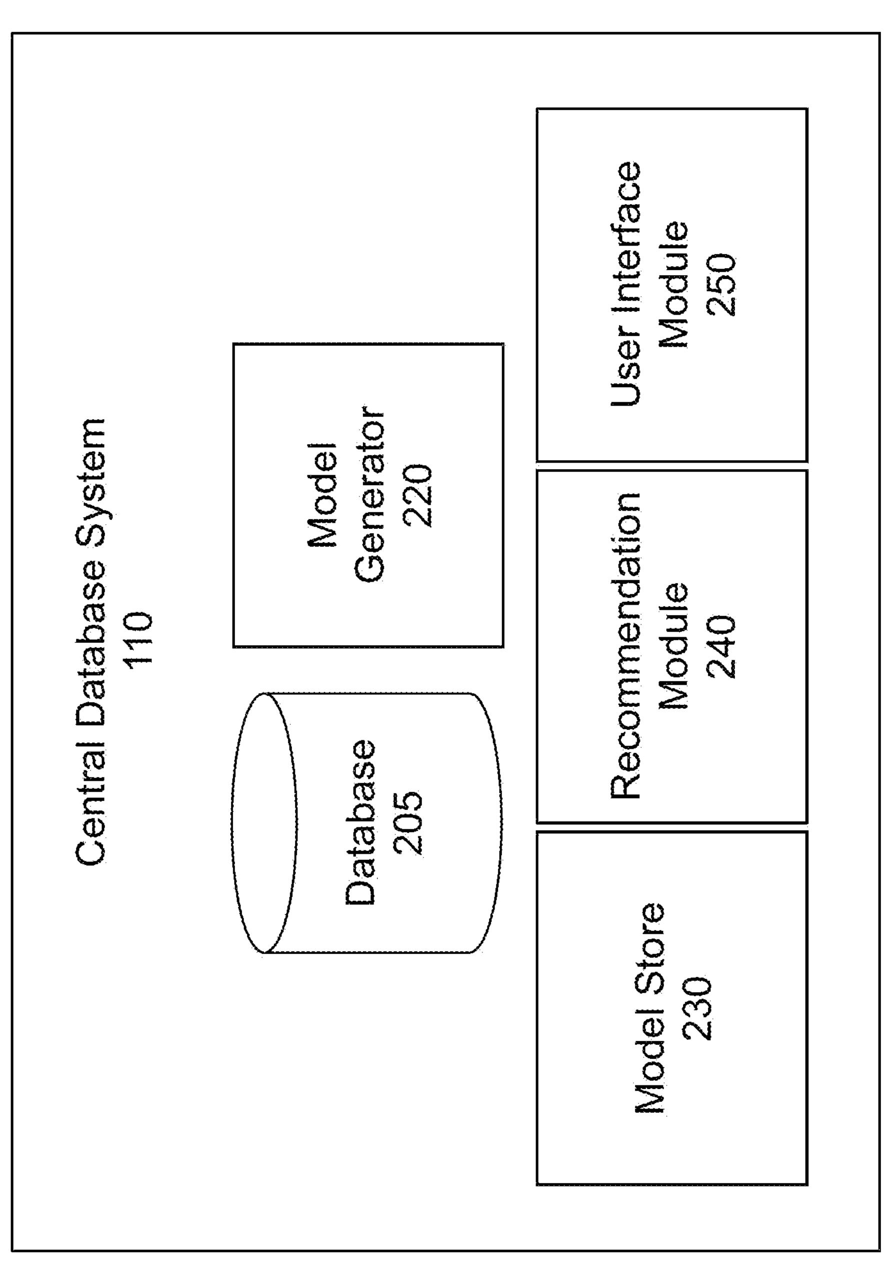
FIG. 2 is a block diagram illustrating a system architecture of the central database system, according to one embodiment.

FIG. 2 is a block diagram illustrating a system architecture of the central database system 110, according to one embodiment. The central database system 110 of FIG. 2 includes a database 205, a model generator 220, a model store 230, a recommendation module 240, and a user interface module 250. It should be noted that in other embodiments, the central database system 110 can include fewer, additional, or different components than those illustrated herein. In addition, in the embodiment of FIG. 1, the central database system 110 is different from the historical entities 130 and the target entity 140. Accordingly, the central database system 110 includes hardware (such as servers, networking equipment, databases or other storage devices, data center systems, and the like) distinct (and in some embodiments, physically remotely from) the devices associated with the historical entities 130 and the target entity 140.

The database 205 is configured to store information associated with the historical entities 130 and the target entity 140. In some embodiments, the information stored in the database 205 includes information gathered from the historical entities 130 and/or the target entity 140 as they register with the central database system 110. For instance, the central database system 110 may be an enterprise software provider that provides human resources software to employers (e.g., entities, including the historical entities 130 and the target entity 140) for use with employees (e.g., individuals associated with the entities). Each employer may provide information describing the characteristics of the employer and characteristics of each of the employees to the central database system 110. The database 205 stores this information about each of the entities.

In some embodiments, the database 205 may also store information about issues previously encountered by the entities (or individuals associated with the entities), such as those relating to employee training, onboarding, termination, payroll, taxes, and so on. In some embodiments, the database 205 may also store information about actions performed by entities (or individuals associated with the entities), and may additional store information about resources (such as computing resources, memory, data storage, bandwidth, processing power, servers or computer systems, devices, network resources, cloud server resources, time, human-performed actions, and the like) used or required to perform such actions.

The model generator 220 trains machine-learned models. As described above, in some embodiments, the central database system 110 trains and uses a machine-learned model to predict events that an entity (e.g., the target entity 140) is likely to face within a set period in the future (e.g., in the next 90 days). In some embodiments, the model generator 220 uses data stored in the database 205, about the historical entities 130 and the target entity 140, to train a machine-learned model, which is configured to output issues that the target entity 140 is likely to face in the future or in a future period of time. In some embodiments, the machine-learned model also outputs recommended actions based on characteristics of the target entity 140 and the identified future issues. In some embodiments, the model generator 220 also trains a machine-learned model configured to identify resources required by the target entity 140 to perform one or more actions, beneficially enabling the central database system 110 to provide those resources for the target entity 140 before they are necessary. In other embodiments, the model generator 220 trains a machine-learned model configured to identify actions that the target entity 140 is likely to perform or request to be performed in the future. Additional details about the training and application of the machine-learned models are described below, for instance with respect to FIGS. 3-5.

The model store 230 stores the machine-learned models generated by the model generator 220. In some embodiments, the model store 230 may store various versions of models as they are updated over time. In other embodiments, the model store 230 may store multiple versions of a type of model. The models can be accessed from the model store 230 by the central database system 110 or the modules of the central database system as needed.

The recommendation module 240 applies one or more of the models stored within the model store 230 to perform one or more actions, to make one or more recommendations, and/or to improve a user's or entity's experience in interacting with the central database system 110. For instance, in some embodiments the recommendation module 240 selects actions to help mitigate future issues that the target entity 140 is likely to face. The recommendation module 240 identifies such future issues by applying an issue-prediction machine-learned model to one or more characteristics or actions associated with the target entity 140.

The recommendation module 240 can then select one or more actions based on the identified future issues and/or based on characteristics of the target entity 140. In some embodiments, the recommendation module 240 generates a recommendation to the target entity 140 to perform the selected actions, and in other embodiments, the recommendation module 240 automatically performs the selected actions. Examples of such selected actions include but are not limited to offering a service to the target entity 140, offering educational material to the target entity, to notify the target entity about the identified future issues, modifying content presented to the target entity, and the like. In some embodiments, the machine-learned model is trained to identify one or more actions to perform based on the identified issues the target entity is likely to encounter. The training and implementation of a machine-learned model to identify future issues the target entity is likely to encounter and the selection of actions to mitigate such issues are described below in greater detail with respect to FIG. 3.

In some embodiments, the recommendation module 240 proactively recommends or performs one or more actions based on actions that the target entity 140 is likely to perform or request. The recommendation module 240 identifies such actions by applying an action-prediction machine-learned model to one or more characteristics or actions associated with the target entity 140. The recommendation module 240 can then select one or more actions based on the identified future actions and/or based on characteristics of the target entity 140. In some embodiments, the recommendation module 240 generates a recommendation to the target entity 140 to perform a proactive action, generates a notification to the target entity associated with the future actions, or automatically performs the proactive action. Examples of such proactive actions include but are not limited to the predicted future actions, modifying content presented to the target entity, notifying the target entity of an upcoming deadline or information/actions required to address the deadline, notifying the target entity of the requirements of the future actions, recommendation one or more features or functionalities to the target entity, and the like. In some embodiments, the machine-learned model is trained to identify one or more proactive actions to perform based on the identified future actions the target entity is likely to perform or request. The training and implementation of a machine-learned model to identify future actions the target entity is likely to perform or request and the selection of proactive actions to perform or recommend based on such future actions are described below in greater detail with respect to FIG. 4.

In some embodiments, the recommendation module 240 proactively recommends or provides resources needed to perform future actions that the target entity 140 is likely to perform or request. The recommendation module 240 identifies such resources by applying a resource-prediction machine-learned model to one or more characteristics or actions associated with the target entity 140. The recommendation module 240 can then perform actions associated with the predicted resources and/or based on characteristics of the target entity 140. In some embodiments, the recommendation module 240 generates a recommendation to the target entity 140 to request, subscribed to, or allocate the predicted resources, while in other embodiments, the recommendation module automatically allocates the predicted resources to the target entity in advance of the performance of the predicted future actions. Examples of such predicted resources include but are not limited to memory, storage, network resources, processing power, and the like. The training and implementation of a machine-learned model to identify resources required for actions that the target entity is likely to request or perform is described below in greater detail with respect to FIG. 5.

The user interface module 250 generates user interfaces for users (e.g., individuals associated with the central database system 110, historical entities 130, and target entity 140) to interact with the central database system 110. The user interface module 250 receives input from users regarding information about the individuals associated with entities, characteristics about the entities, actions performed by the entities, resources used by the entities to perform such actions, and issues faced by the entities. In some embodiments, the central database system 110 notifies the target entity 140 of predicted future issues, of recommendation actions, of resources allocated to the entities, and the like via the user interface module 250. Users (e.g., associated with the target entity 140) may provide feedback regarding the accuracy of the predicted future issues, efficacy of the performed action, and so on.

Figure 3:
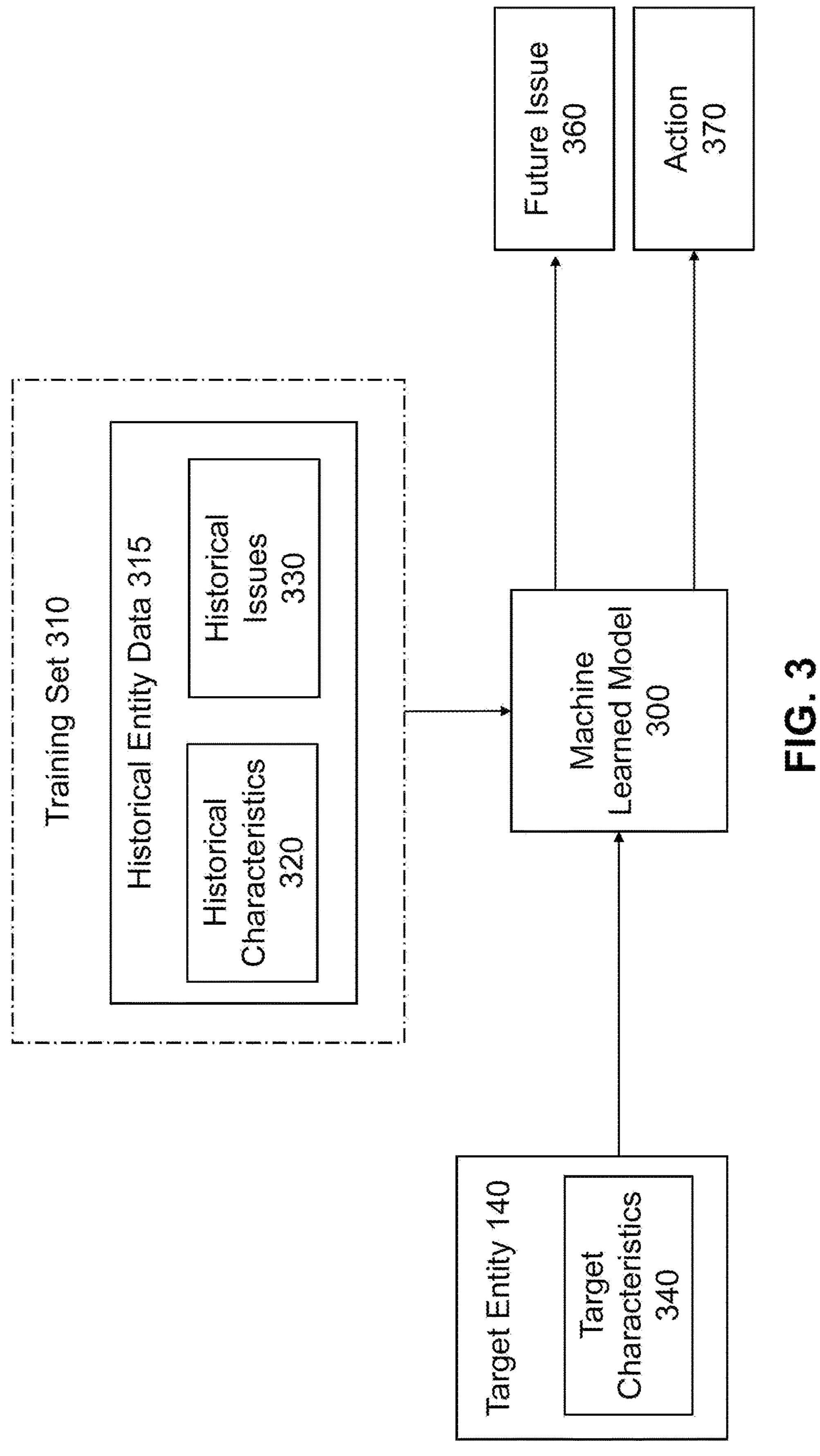
FIG. 3 illustrates training and applying a machine-learned model configured to identify future issues that a target entity is likely to face, according to one embodiment.

FIG. 3 illustrates training and applying a machine-learned model 300 configured to identify future issues 360 that the target entity 140 is likely to face, according to one embodiment. As described above, the machine-learned model is trained on historical data, including characteristics about the historical entities 130 and issues previously faced by the historical entities 130, and identifies issues the target entity 140 is likely to face within a future threshold interval of time. As used herein, an interval of time can refer to an hour, 2 or more hours, a day, a week, a two week period of time, a month, a quarter, a year, or any other suitable amount of time.

The model generator 220 trains the machine-learned model 300 using a training set 310, including historical entity data 315. The historical entity data 315 includes information about each of the historical entities 130, including historical characteristics 320 of the historical entities and information representative of historical issues 330 they have previously faced. Historical characteristics 320 include, for example, a type of each entity (e.g., a company, an educational institution, a professional or charitable association, an employer, an employee, a government organization, and the like), an age of the entity (e.g., how long the entity has been in business, been established, etc.), a number of individuals or headcount associated with entity, an industry or focus associated with the entity, a filing city or state associated with the entity (e.g., where the entity files taxes), a tax status of the entity (e.g., for-profit business, non-profit organization, etc.), a state of incorporation or registration of the entity, cities or states in which the entity is present (e.g., does business, has offices, etc.), cities or states in which the entity has employees or members, addresses associated with the entity (e.g., addresses of offices of the entity), compliance expertise of the entity, services offered by the entity, software used by the entity, revenue or profits of the entity, budget for human resources, growth rate of the entity, geographic locations of customers of the entity, entities associated with the entity, or any other suitable characteristic of the entity. Historical issues 330 include, for example, issues relating to employee onboarding (e.g., training, conflict checks, immigration procedures, I-9 verification, bank account verification, background checks, etc.), termination (e.g., severance pay, exit interviews, equipment and badge return, contact information verification, etc.), independent contractors (e.g., tax questions, liability questions, classification, payments, etc.), payroll (e.g., employee bank account linking, processing, automatic scheduling, retirement accounts), taxes (e.g., completing tax forms, employee withholding, audits, payments), and so on.

The machine-learned model 300 takes, as input, target characteristics 340 about the target entity 140. Target characteristics 340 may include categories of information similar to the historical characteristics 320 identified above, but for the target entity 140. In some embodiments, the target characteristics 340 includes issues (e.g., similar to the historical issues 330) previously encountered by the target entity 140.

The model generator 220 may use one or more different types of supervised or unsupervised machine learning, or any other suitable training technique to generate and update the machine learned model 300. In some embodiments, the model generator 220 uses one or more of linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on for training the machine-learned model 300. The machine-learned model 300 is trained to identify patterns or correlations between the historical characteristics 320 and the historical issues 330 to identify, based on the target characteristics 340, what future issues 360 the target entity 140 is likely to face. For instance, the machine-learned model 300 may determine that, for a target entity with a history of hiring temporary contractors, the target entity may have increased onboarding needs (to onboard the temporary contractors) relative to other companies that hire fewer temporary contracts, and reduced termination issues (due to having fewer full-time employees) relative to companies that have more full-time employees.

The machine-learned model 300, in some embodiments, also outputs a likelihood that the target entity 140 will face the future issue 360 within a threshold period of time (e.g., in the next 90 days). The central database system 110 may select the future issues 360 that the target entity 140 faces the highest probability of encountering. In other embodiments, the central database system 110 selects the future issues 360 that the target entity 140 has at least a minimum threshold probability of encountering (e.g., any future issue with over a 75% likelihood of encountering in the next 90 days). The central database system 110 may run the machine-learned model 300 periodically (e.g., every week, month, or quarter) to ensure timely, accurate predictions of future issues 360.

The recommendation module 240 selects a recommended action 370 based on the identified future issue 360 and target characteristics 340. The recommended action 370 may help mitigate the future issue 360 for the target entity 140. For example, the recommended action 370 may include notifying users of the target entity 140 of the future issue 360 and/or notifying users of the central database system 110 of the future issue 360, such as through the user interface module 250. The recommended action 370 may include offering a service (or a referral to a service) to users of the target entity 140 to mitigate the future issue 360 (e.g., a simulated tax audit, proactive payroll monitoring, employee verification and background checks, referrals to accounting firms and law firms, etc.).

In other embodiments, the recommended action 370 may include providing education material to the target entity 140 about the identified future issue 360 (e.g., how-to guides on certain tax requirements, trainings on the target entity 140's liability for independent contractors, etc.). The recommendation module 240 may provide different recommended actions 370 based on the target entity's characteristics 340. For example, a small target entity 140 may not have the resources to perform a simulated tax audit and would thus prefer educational material. In another example, a growing target entity 140 that plans to hire foreign nationals may require a referral for efficient, reliable immigration services. The central database system 110 proactively performs the recommended action 370, mitigating future issues 360 that the target entity 140 is likely to face in the future.

In some embodiments, the machine-learned model 300 is configured to identify the recommended actions 370. For instance, the machine-learned model can be trained on training data that additionally includes historical actions performed by the central database system 110 when historical entities encounter historical issues, and the machine-learned model can select actions to perform for a target entity based on the historical actions performed by the central database system 110 when historical entities similar to the target entity encounter similar issues to the future issues the target entity is predicted to encounter.

Figure 4:
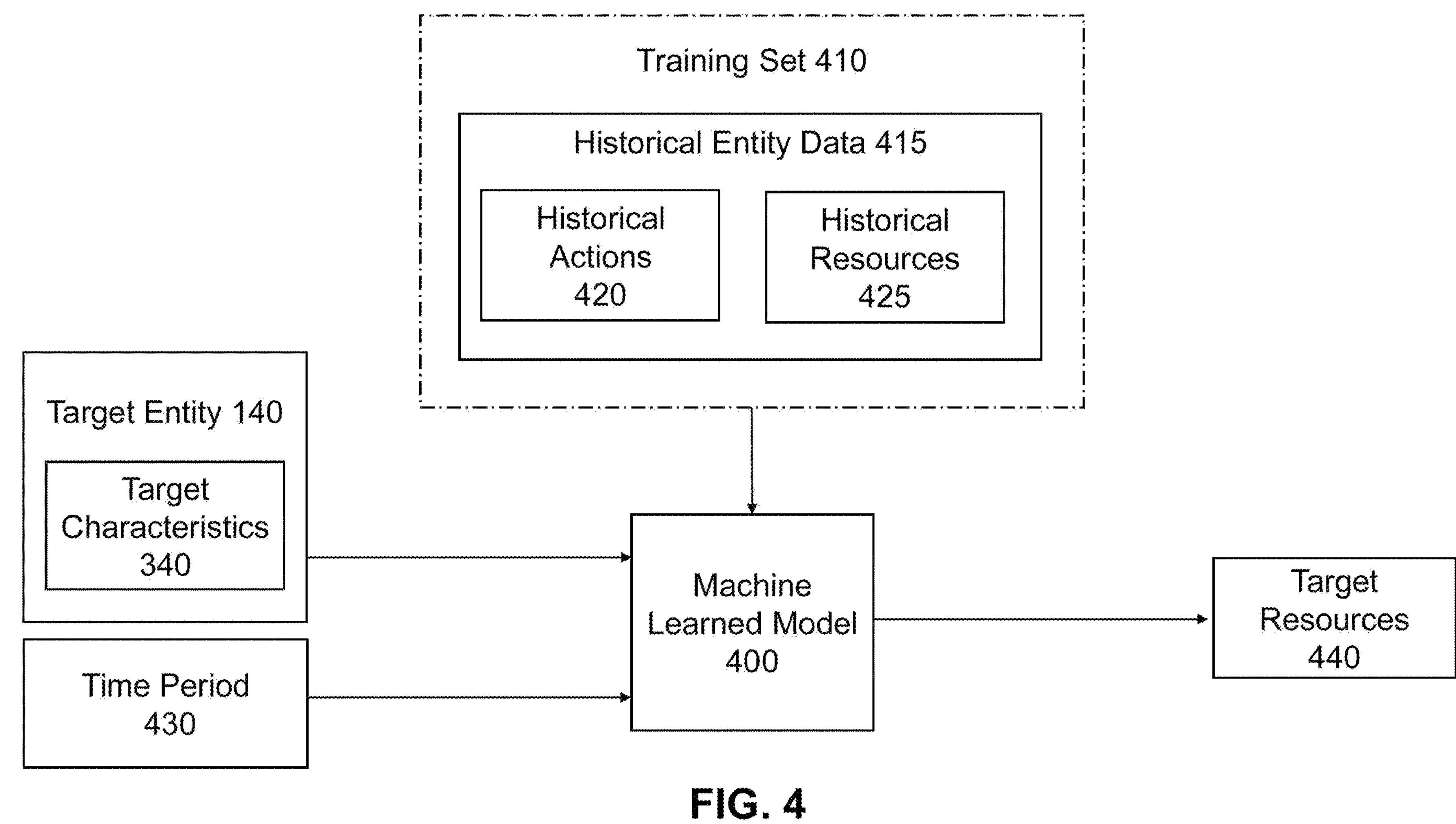
FIG. 4 illustrates training and applying a machine-learned model configured to identify resources for the central database system based on target entity characteristics, according to one embodiment.

FIG. 4 illustrates training and applying a machine-learned model 400 configured to identify resources 440 for the central database system 110 based on target entity characteristics 340, according to one embodiment. In effect, the machine-learned model 400 identifies resources 440 that the target entity 140 is likely to need from central database system 110 within a time period, for instance in order to perform actions that the target entity is likely to request be performed by or in association with the central database system.

The machine-learned model 400 is trained on a training set 410, comprising historical entity data 415. The historical entity data 415 includes actions 420 taken by historical entities 130 with respect to the central database system 110 and resources 425 expended by the central database system 110 to assist each historical entity 130 in the performance of the actions. Historical actions 420 include, for example, registering with the central database system 110, subscribing to a service (e.g., payroll management, employee information verification, benefits enrollment, etc.) of the central database system 110, unsubscribing to a service of the central database system 110, renewing a service with the central database system 110, creating and/or terminating employee accounts on the central database system 110, and so on.

Historical resources 425 include resources required to perform tasks by the central database system 110 when performing a historical action 420. Historical resources 425 can include computing resources, such as central database system memory, central database system data storage capacity, central database system bandwidth, central database system processing power, server capacity, network resources, and cloud resources. Historical resources 425 can also include, for example, non-computing resources, such as calls with central database system 110 personnel, training by central database system 110 personnel, liaising with a third party by the central database system 110, and so on.

Historical resources 425 may include information about the resource's volume, timing, frequency, a level of difficulty to provide, and so on. For example, the historical entity data 415 may include data on how often a historical entity 130 contacted (e.g., a historical resource 425) the central database system 110 to address a historical action 420. In another example, the historical entity data 415 may include how difficult it was for the central database system 110 to dispatch a historical resource 425 in response to a historical action 420 (e.g., few staff at the central database system 110 when the action 420 was reported, making the resource 425 difficult to dispatch). The training set 410 is updated periodically with new information (e.g., new actions and resources) about the historical entities 130.

The model generator 220 may use one or more different types of supervised or unsupervised machine learning, or any other suitable training technique to generate and update the machine learned model 400. In some embodiments, the model generator 220 uses one or more of linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on for training the machine-learned model 400. The trained machine-learned model 400 is trained to identify patterns or correlations between the historical actions 420 and the historical resources 425 required to perform or implement the actions.

The trained machine-learned model 400 takes, as input, target characteristics 340 of the target entity 140, as well as information representative of a likely time period 430 in which one or more actions will be performed or resources will be required by the target entity. The time period 430 may represent all or a portion of a day and time of day, a fiscal quarter, a season, a year, a decade, business changes, and/or relevant current events (e.g., pandemic, election year, etc.). Time periods may also be holidays, holiday seasons, business days, weekends, and so on.

For a target entity 140 during a given time period 430, the trained machine-learned model 400 predicts target resources 440 that the central database system 110 will need to provide the target entity 140 in order for one or more future actions to be performed. For example, the machine-learned model 400 may learn that during the summer season, on average, four to five employees of the target entity 140 experience a qualifying life event (e.g., getting married) that results in a change in their insurance benefits (e.g., an action). Accordingly, the machine-learned model 400 may predict that during the summer, the target entity 140 is likely to experience an increase in phone calls (e.g., a resource) from the target entity 140's employees, and an increased call bandwidth is required. In another example, the machine-learned model 400 may learn that a target entity 140 onboards new employees in the first week of every month, requiring the central database system 110's onboarding services and corresponding increased memory usage and processing power during that time. Thus, the machine-learned model 400 may predict that in the first week of every month, the central database system 110 will see an increase in requests for new accounts from the target entity 140.

Using the target resources 440 predicted by the machine-learned model 400, at any time, the central database system 110 can predict the types of tasks, number of tasks, and difficulty of tasks that will be requested by the target entity 140. In some embodiments, the machine-learned model 400 is additionally configured to predict the future actions that will be requested by the target entity 140, for instance as described herein. In some embodiments, the central database system 110 provides the target resources 440 to the target entity 140 in advance of the time period. In addition, the central database system 110 may plan for its own staffing needs (e.g., by predicting how many staff members it needs to address future concerns and/or issues that may arise with the target entity 140). The central database system 110 may hire more staff members, terminate staff members, flag overcapacity issues, increase communication bandwidth, and so on.

In some embodiments, the central database system 110 reconfigures the central database system in order to provide the target resources 440 to the target entity 140. For instance, the central database system 110 can reconfigure one or more processing resources in order to dedicate the processing resources for use by the target entity 140. Likewise, the central database system 110 can re-configure or modify one or more software components of the central database system, can reconfigure which processes or entities memory is allocated to within the central database system, can close or terminate processes or applications running on the central database system in order to free up memory or bandwidth of the central database system, or can prioritize finishing actions or tasks requested or performed in association with other entities. In some embodiments, the central database system 110 allocates or reserves bandwidth, memory, network resources, cloud resources, and/or other computing resources for use by the target entity 140. In such embodiments, other entities are unable to access the reserved resources after the time period in which the target entity 140 is predicted to need the resources until after the time period has ended. In yet other embodiments, the central database system 110 re-allocates resources slated for use by other entities for use by the target entity 140 instead.

Figure 5:
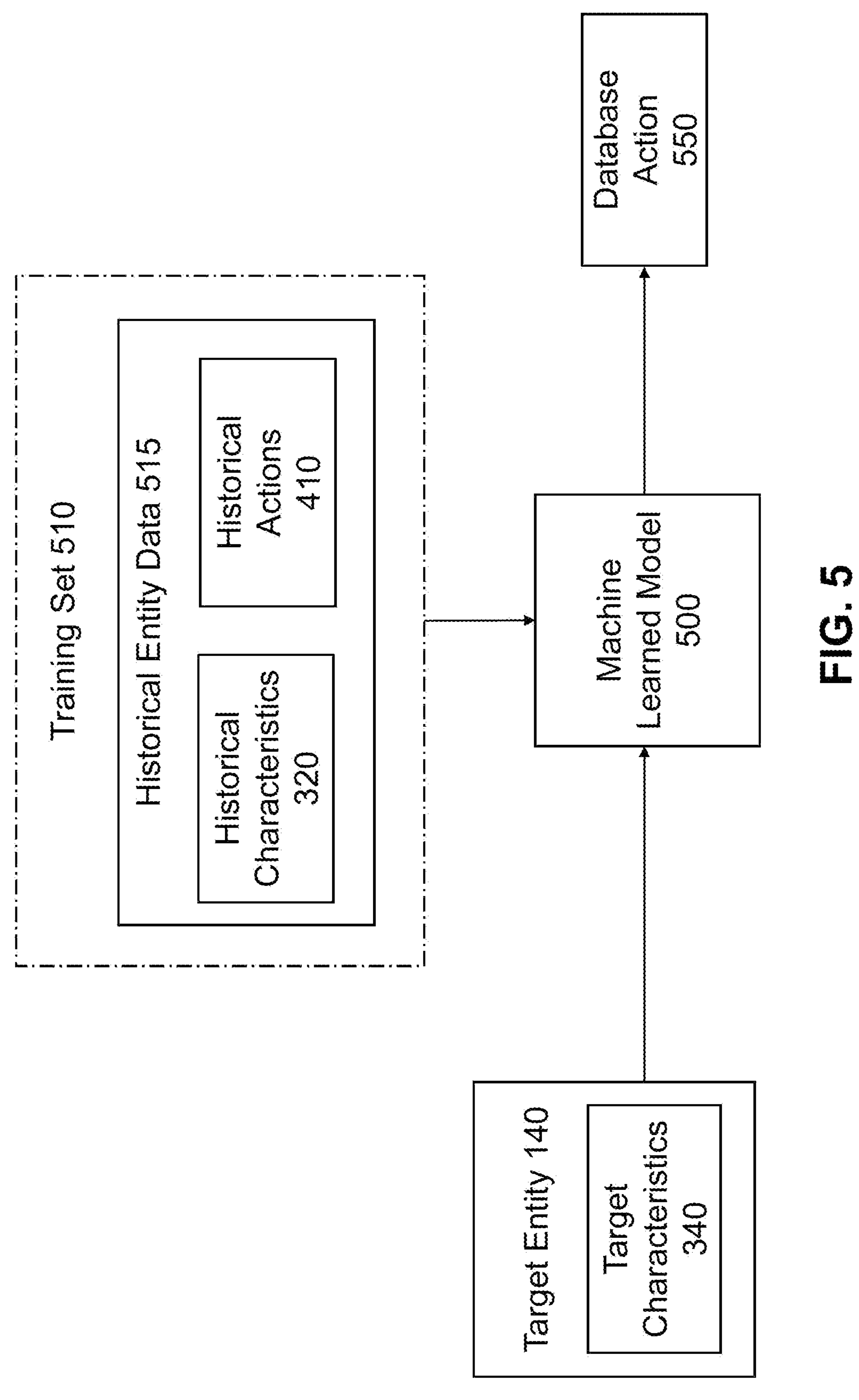
FIG. 5 illustrates training and applying a machine-learned model configured to identify actions for a target entity based on target entity characteristics, according to one embodiment.

FIG. 5 illustrates training and applying the machine-learned model 500 configured to identify database actions 550 for a target entity 140 based on target entity characteristics 340, according to one embodiment. The machine-learned model 500 predicts an action 550 that the target entity 140 is likely to take with respect to the central database system 110 ("a database action").

The model generator 220 trains the machine-learned model 500 using a training set of data 550, which includes historical entity data 515 about the historical entities 130. The historical entity data 515 includes characteristics 320 about the historical entities 130 and actions 410 taken by the historical entities 130. In addition to what has been described above with respect to FIGS. 3-4, the historical characteristics 320 may include demographic information associated with each historical entity 130, major events in the life cycle of each historical entity 130, internal changes in the administration and executive board of each historical entity 130, a growth rate of each historical entity 130, and so on. Similarly, the historical actions 410 may also include, for each historical entity 130, a frequency of use of one or more functionalities or features of the central database system 110, most recently used services of the central database system 110, changes in services (e.g., a change in health insurance carrier) associated with the central database system 110, and so on.

The model generator 220 may use different versions of supervised or unsupervised machine learning, or another training technique to generate and update the machine learned model 500. In some embodiments, other training techniques may be linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The machine-learned model 500 is trained to identify patterns or correlations between the historical characteristics 320 and the historical actions 410 to identify, based on the target characteristics 340 of a target entity 140, what future database actions 550 the target entity is likely to request or perform in association with the central database system 110. For example, the machine-learned model 500 may predict a likelihood that the target entity 140 may leave or no longer use the central database system 110, may unsubscribe from a particular service and/or feature of the central database system 110, may ask to upgrade a particular service and/or feature of the central database system 110, may ask to downgrade from a particular service and/or feature of the central database system 110, may refer the central database system 110 to new entities, may engage in international contracts with the central database system 110, may require a discount and/or concession from the central database system 110, and so on.

The central database system 110 may, in response to predicting future actions that target entity 140 is likely to perform or request, proactively take actions to ensure a successful, continued use of the central database system 110 by the target entity 140. For example, the central database system 110 may proactively make a recommendation that the target entity 140 perform an action in advance of performing the predicted future database actions. Likewise, the central database system 110 may modify content for presentation to the target entity 140, such as information or materials detailing how to perform the predicted future database actions. In some embodiments, the central database system 110 may generate a notification indicating upcoming deadlines or information/actions required to address the deadline and may present the generated notification to the target entity 140. In yet other embodiments, the central database system 110 may notify the target entity 140 of the requirements for performing the predicted future database actions, and/or may recommend one or more features or functionalities of the central database system associated with the predicted future database actions to the target entity. In effect, the central database system 110 may be able to predict the target entity 140's needs in advance of performing actions the target entity is predicted to perform or request, and is able to proactively act in order to improve the target entity's ability to or experience in doing so.

In some embodiments, proactively performing one or more actions associated with the predicted set of future database actions includes performing the one or more actions before the predicted set of future database actions is even requested by the target entity, and without feedback from the target entity. In some embodiments, proactively performing one or more actions associated with the predicted set of future database actions comprises generating a recommendation to the target entity that the one or more actions be performed, and performing the one or more actions in response to an instruction from the target entity. In some embodiments, proactively performing one or more actions associated with the predicted set of future database actions comprises performing the predicted set of future database actions before the target entity requests the predicted set of future database actions be performed.

Figure 6:
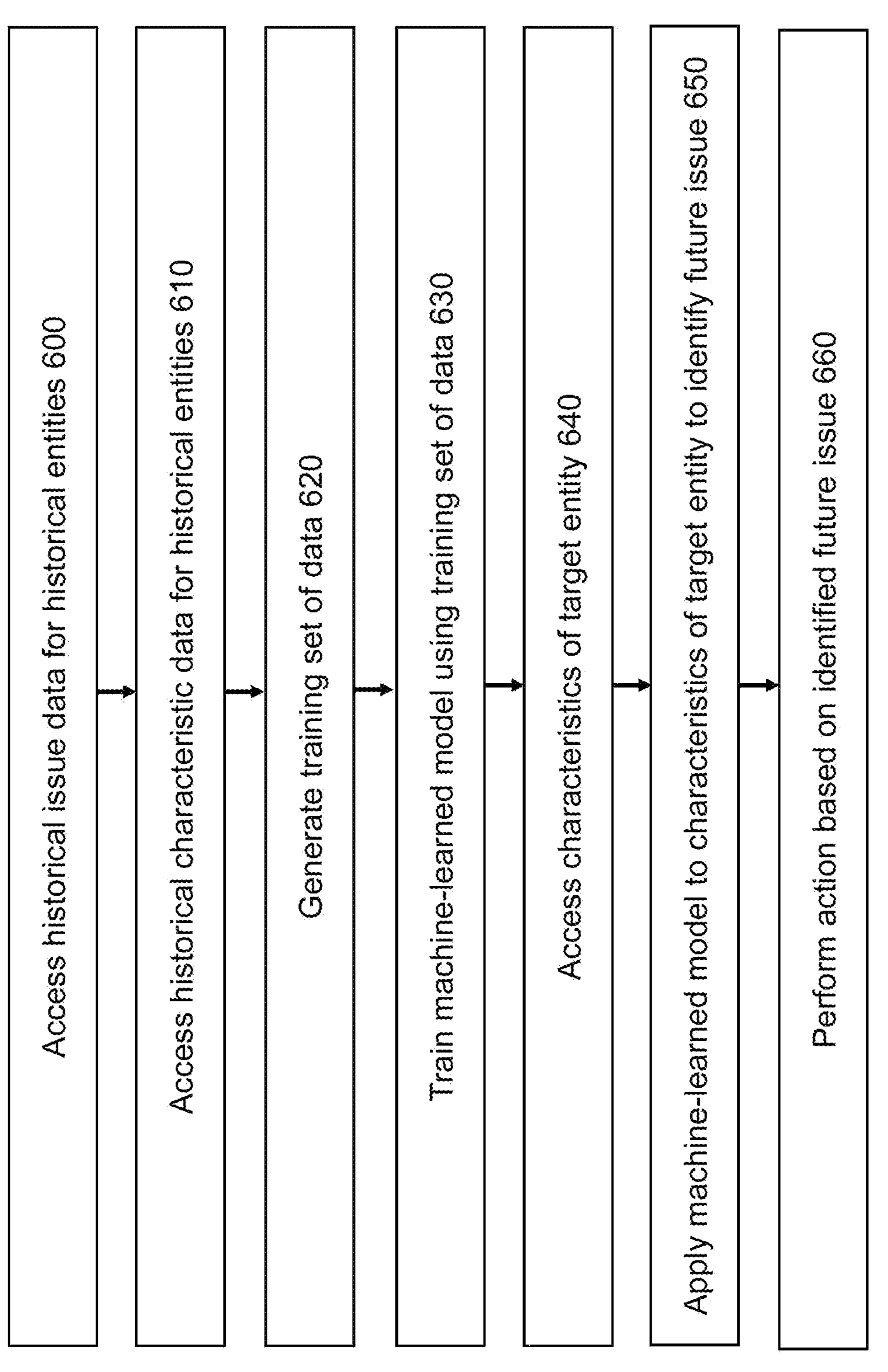
FIGS. 6-8 illustrate example processes for training and applying machine-learned models within a central database system environment, according to example embodiments.

FIG. 6 illustrates an example process for training and applying a machine-learned model to a central database system to predict future issues for a target entity, according to one example embodiment. It should be noted that in other embodiments, the process of FIG. 6 can include fewer, additional, or different steps than those described herein.

A central database system (e.g., the central database system 110) accesses 600 historical issue data for each of a set of historical entities (e.g., the historical entities 130). The historical issue data includes information representative of issues previously encountered by the historical entities. For instance, the historical issue data can describe a type of issue encountered by a historical entity, a frequency that the issues were encountered, and circumstances associated with the issues when they were encountered (such as a time or time interval in which the issues were encountered). The historical issue data can additionally include information representative of a resolution of any historical issues, such as steps taken by the central database system or the historical entity to address or mitigate the historical issues. For example, the historical issue data can include information representative of a data audit issue encountered by a historic entity, can indicate that the data audit issue had been previously encountered by the historic entity, and can indicate that the data audit issues occurred in the final quarters of various years for the historic entity.

The central database system additionally accesses 610 historic characteristic data representative of characteristics of the historical entities that encountered the historic issues described above. Examples of historic characteristic data include but are not limited to an entity type (e.g., a business, a service provider, a non-profit organization, a government body, and the like), a size of the entity (how many individuals are employed by or associated with the entity), a location or jurisdiction associated with the entity, or any other suitable characteristics representative of the historic entities. In some embodiments, the historic characteristic data additionally includes information representative of a correlation between the characteristics of the historical entities and the historical issues faced by the historical entities. For instance, the historic characteristic data can include an indication that an entity associated with the jurisdiction of California and thus is subject to California labor law issues with employees located within California.

The central database system generates 620 a training set of data (e.g., the training set 310) based on the accessed historical data and historical entity data. The central database system then trains 630 a machine-learned model (e.g., the machine-learned model 300) using the training set of data. The machine-learned model is configured to predict issues that an entity will encounter within a particular interval of time, based on characteristics associated with the entity input to the machine-learned model. In some embodiments, the machine-learned model determines, for each issue of a set of issues, a probability that an entity will encounter the issue within a particular interval of time.

The central database system accesses 640 characteristics associated with the target entity (e.g., the target characteristics 340). Examples of such accessed characteristics include but are not limited to a type of the target entity, a size of the target entity, and information representative of a history of issues previously encountered by the target entity.

The characteristics of the target entity can be accessed after and in response to selecting the target entity, for instance, to predict issues that the target entity may encounter.

The central database system applies 650 the machine-learned model to the accessed set of characteristics of the target entity to identify one or more future issues (e.g., the future issue 360) that the target entity is likely to face. For instance, the machine-learned model may determine, based on the type of the target entity and the target entity's history with encountering a particular type of issue, that the target entity is likely to encounter the issue within a next interval of time (e.g., within the next week).

The central database system proactively performs 660 for the target entity, an action (e.g., the action 370) selected based on the target entity's characteristics and the identified future issue. The proactively performed actions can be selected in part in order to mitigate the identified future issue. In some embodiments, the proactive action includes notifying the target entity about the future issue, notifying users associated with the central database system about the future issue, offering a service or functionality to the target entity to mitigate the identified future issue, making recommendations for or presenting content to the target entity, and initiating an audit of the target entity.

In some embodiments (both with regards to the issue-prediction machine-learned models described in FIG. 6 and the other machine-learned models described herein), the central database system can proactively perform one or more actions (for instance, in order to mitigate predicted issues, based on predicted actions the target entity will want to perform, or based on predicted resources the target entity is predicted to require) by reconfiguring one or more aspects of the central database system. This can include but is not limited to reconfiguring one or more software components of the central database system, allocating or re-allocating one or more software or hardware resources of the central database system, reconfiguring one or more network resources associated with the central database system, or reconfiguring any other suitable resource, property, or configuration of the central database system.

Figure 7:
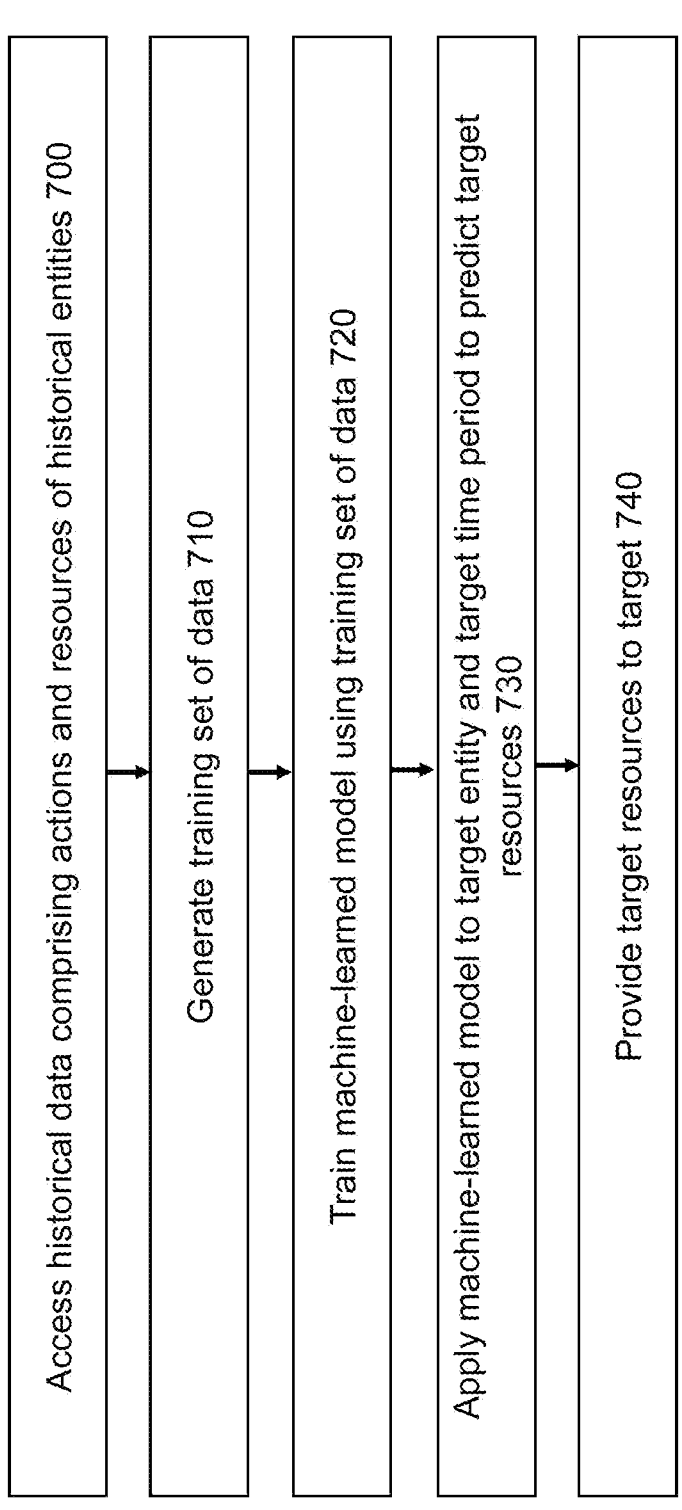

FIG. 7 illustrates an example process for training and applying a machine-learned model to a central database system to predict target resources likely to be required by a target entity or actions that are likely to be performed by the target entity in the future, according to one example embodiment. It should be noted that in other embodiments, the process of FIG. 7 can include fewer, additional, or different steps than those described herein.

The central database system accesses 700 historical data including, for each of a set of historical entities, a set of actions (e.g., the historical actions 420) requested by the historical entity during a historical time period. For instance, the historical data can include one or more database operations requested by the historical entities, one or more modifications to data stored by the central database system, or one or more actions taken by the historical entities associated with the central database system. The historical data can additionally include one or more resources (e.g., the historical resources 425) required by the central database system to perform the requested historical action during the historical time period.

The central database system generates 710 a training set of data (e.g., the training set 410) based on the accessed historical data. The central database system then trains 720 a machine-learned model (e.g., the machine-learned model 400) using the training set of data. The model is configured to predict, for an entity and a time period, resources required to perform actions requested by the entity during the time period for instance based on characteristics associated with the entity and a history of central database system resources required by the entity to perform previous actions in association with the central database system. For example, the machine-learned model can determine, for an entity with a history of high-bandwidth database table update actions each night at midnight, that the entity is likely to require additional bandwidth each night in order to perform the table update actions without issue.

The central database system applies 730 the machine-learned model to characteristics of a target entity (such as a size and type of the target entity, historical actions performed by the target entity, historical resources used by the target entity, and the like) and a target time period (e.g., the time period 430). The model predicts a set of target resources (e.g., the target resources 440) that will be required by the target entity to perform one or more actions that the target entity is likely to perform or request by performed during the target time period.

The central database system provides 740 the predicted set of target resources to the target entity in advance of the target time period. In some embodiments, the central database system reconfigures the central database system in order to provide the predicted set of target resources to the target entity. In some embodiments, the central database system allocates or reserve resources for use by the target entity in advance of the target time period, or re-allocates resources from a different entity to the target entity.

Figure 8:
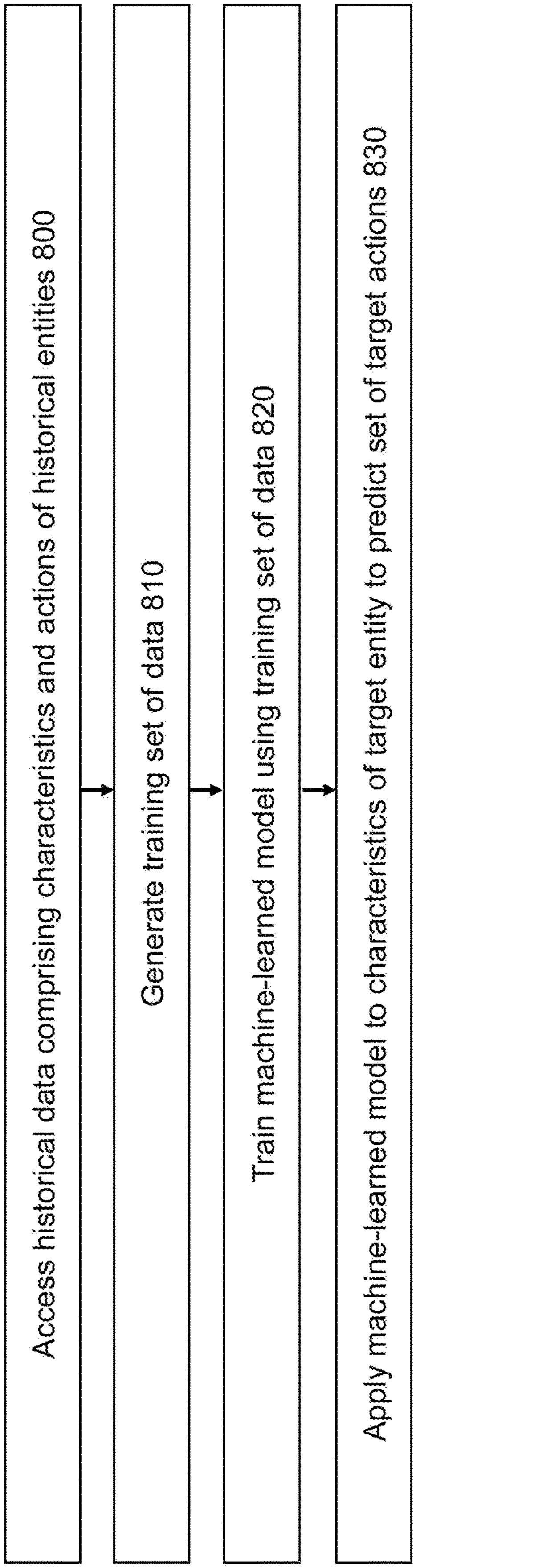

FIG. 8 illustrates an example process for training and applying a machine-learned model to a central database system to predict actions that a target entity may take regarding the central database system, according to one example embodiment. It should be noted that in other embodiments, the process of FIG. 8 can include fewer, additional, or different steps than those described herein.

The central database system accesses 800, for each of a set of historical entities, historical data describing actions taken by the historical entity and characteristics of the historical entity as it changes over time. For instance, the historical data can include information representative of new employee onboarding statistics and timing, industries associated with the historical entities, and locations/jurisdictions associated with the historical entities. Likewise, the historical data describing actions taken by the historical entities can include requesting computing operations to be performed by the central database system, can include operations performed using data stored or provided by the central database system, can include actions performed by the historical entities, or can include any other suitable actions associated with the central database system or the historical entities.

The central database system generates 810 a training set of data (e.g., the training set 510) based on the accessed historical data. The central database system trains 820 a machine-learned model (e.g., the machine-learned model 500) using the training set of data. The machine-learned model is configured to, when applied characteristics of an entity and/or previous actions taken or requested by the entity, predict future actions that the entity is likely to perform or request, for instance over a future interval of time. For example, the machine-learned model can determine that an entity in the midst of layoffs is likely to request the generation of documents associated with the layoffs using information stored by the central database system.

The central database system identifies a target entity and applies 830 the machine-learned model to characteristics of or previous actions taken by the target entity to predict a set of target actions (e.g., the database actions 550) that the target entity is likely to perform. The central database system then proactively performs 840 one or more proactive actions associated with the predicted set of target actions in advance of the set of target actions being performed by the target entity.

In some embodiments, proactively performing one or more actions associated with the predicted set of target actions includes performing the one or more actions before the predicted set of target actions is requested by the target entity, without feedback from the target entity. In some embodiments, proactively performing one or more actions associated with the predicted set of target actions includes generating a recommendation to the target entity that the one or more actions be performed, and performing the one or more actions in response to an instruction from the target entity. In some embodiments, proactively performing one or more actions associated with the predicted set of target actions comprises performing the predicted set of target actions before the target entity requests the predicted set of target actions be performed.

Examples of proactively performing actions associated with the predicted set of target actions include but are not limited to: modifying content presented to the target entity, notifying the target entity of an upcoming deadline or information/actions required to address the deadline, notifying the target entity of the requirements of the predicted set of target actions, and recommending one or more features or functionalities associated with the predicted set of target actions to the target entity.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

accessing, by a central database system for each of a set of historical entities, historical data describing 1) a historical time period, 2) historical actions requested by the historical entity during the historical time period, and 3) historical resources required by the central database system to perform the requested historical actions during the historical time period;

generating, by the central database system, a training set of data based on the accessed historical data;

training, by the central database system, a machine-learned model using the training set of data, the machine-learned model configured to predict, for an entity and a time period, resources required to perform actions requested by the entity during the time period;

applying, by the central database system, the machine-learned model to a target entity and a target time period to predict a set of target resources that will be required for the target entity and the target time period; and modifying, by the central database system, a configuration of the central database system by reserving the predicted set of target resources for the target entity such that the predicted set of target resources are available to the target entity in advance of the target time period and such that another entity is unable to access the reserved set of target resources after the target time period beings until after the target time period has ended.

2. The method of claim 1, wherein the historical actions requested by the historical entities during the historical time period comprise actions performed using the central database system or data stored by the central database system, and wherein the historical resources required by the central database system comprises computing resources used by the central database system during the performance of the historical actions.

3. The method of claim 1, wherein the historical time period comprises one or more of: an hour, a day, a week, two weeks, a month, a quarter, and a year.

4. The method of claim 1, wherein the machine-learned model is at least one of a neural network, a logistic regression model, a random forest, a bagged tree, and a decision tree.

5. The method of claim 1, wherein the predicted set of target resources comprises one or more of: central database system memory, central database system data storage capacity, central database system bandwidth, central database system processing power, server capacity, network resources, and cloud resources.

6. The method of claim 1, wherein modifying the configuration of the central database system comprises re-allocating resources currently available to or used by another entity to the target entity.

7. A non-transitory computer-readable storage medium storing executable instructions that, when executed by one or more processors, cause the one or more processors to perform operations comprising:

accessing, by a central database system for each of a set of historical entities, historical data describing 1) a historical time period, 2) historical actions requested by the historical entity during the historical time period, and 3) historical resources required by the central database system to perform the requested historical actions during the historical time period;

generating, by the central database system, a training set of data based on the accessed historical data;

training, by the central database system, a machine-learned model using the training set of data, the machine-learned model configured to predict, for an entity and a time period, resources required to perform actions requested by the entity during the time period;

applying, by the central database system, the machine-learned model to a target entity and a target time period to predict a set of target resources that will be required for the target entity and the target time period; and modifying, by the central database system, a configuration of the central database system by reserving the predicted set of target resources for the target entity such that the predicted set of target resources are available to the target entity in advance of the target time period and such that another entity is unable to access the reserved set of target resources after the target time period beings until after the target time period has ended.

8. The non-transitory computer-readable storage medium of claim 7, wherein the historical actions requested by the historical entities during the historical time period comprise actions performed using the central database system or data stored by the central database system, and wherein the historical resources required by the central database system comprises computing resources used by the central database system during the performance of the historical actions.

9. The non-transitory computer-readable storage medium of claim 7, wherein the historical time period comprises one or more of: an hour, a day, a week, two weeks, a month, a quarter, and a year.

10. The non-transitory computer-readable storage medium of claim 7, wherein the machine-learned model is at least one of a neural network, a logistic regression model, a random forest, a bagged tree, and a decision tree.

11. The non-transitory computer-readable storage medium of claim 7, wherein the predicted set of target resources comprises one or more of: central database system memory, central database system data storage capacity, central database system bandwidth, central database system processing power, server capacity, network resources, and cloud resources.

12. The non-transitory computer-readable storage medium of claim 7, wherein modifying the configuration of the central database system comprises re-allocating resources currently available to or used by another entity to the target entity.

13. A central database system comprising one or more hardware processors and a non-transitory computer-readable storage medium storing executable instructions that, when executed by the one or more hardware processors, cause the one or more hardware processors to perform operations comprising:

accessing, by the central database system for each of a set of historical entities, historical data describing 1) a historical time period, 2) historical actions requested by the historical entity during the historical time period, and 3) historical resources required by the central database system to perform the requested historical actions during the historical time period;

generating, by the central database system, a training set of data based on the accessed historical data;

training, by the central database system, a machine-learned model using the training set of data, the machine-learned model configured to predict, for an entity and a time period, resources required to perform actions requested by the entity during the time period;

applying, by the central database system, the machine-learned model to a target entity and a target time period to predict a set of target resources that will be required for the target entity and the target time period; and modifying, by the central database system, a configuration of the central database system by reserving the predicted set of target resources for the target entity such that the predicted set of target resources are available to the target entity in advance of the target time period and such that another entity is unable to access the reserved set of target resources after the target time period beings until after the target time period has ended.

14. The central database system of claim 13, wherein the historical actions requested by the historical entities during the historical time period comprise actions performed using the central database system or data stored by the central database system, and wherein the historical resources required by the central database system comprises computing resources used by the central database system during the performance of the historical actions.

15. The central database system of claim 13, wherein the historical time period comprises one or more of: an hour, a day, a week, two weeks, a month, a quarter, and a year.

16. The central database system of claim 13, wherein the machine-learned model is at least one of a neural network, a logistic regression model, a random forest, a bagged tree, and a decision tree.

17. The central database system of claim 13, wherein the predicted set of target resources comprises one or more of: central database system memory, central database system data storage capacity, central database system bandwidth, central database system processing power, server capacity, network resources, and cloud resources.

18. The central database system of claim 13, wherein modifying the configuration of the central database system comprises re-allocating resources currently available to or used by another entity to the target entity.

* * * * *